United States Patent [19]

Mosley

[11] 4,240,303
[45] Dec. 23, 1980

[54] CHAIN SPROCKET WITH OPPOSITE FRANGIBLE SIDE GUIDE PLATES

[76] Inventor: Earnest D. Mosley, P.O. Box 4922, Greenville, Miss. 38701

[21] Appl. No.: 946,102

[22] Filed: Sep. 27, 1978

[51] Int. Cl.² .................. F16H 55/30; F16H 57/04
[52] U.S. Cl. .................. 474/144; 474/151; 474/161
[58] Field of Search ............ 74/230, 243 R, 243 DR, 74/243 S, 243 FC, 240, 241, 609, 611; 198/842, 834, 840

[56] References Cited

U.S. PATENT DOCUMENTS

| | | | |
|---|---|---|---|
| 579,742 | 3/1897 | Cottie et al. | 474/156 |
| 655,943 | 8/1900 | Williamson | 74/243 R |
| 1,105,518 | 7/1914 | Irvin | 74/243 R |
| 1,181,175 | 5/1916 | Shapiro | 74/243 R |
| 1,937,304 | 11/1933 | Worrall | 74/243 C |
| 2,087,813 | 7/1937 | Peterson | 198/494 X |
| 2,227,557 | 1/1941 | Sinden | 198/494 |
| 2,753,980 | 7/1956 | Ballard | 198/494 |
| 3,119,140 | 1/1964 | Sallet | 74/230 X |
| 3,416,385 | 12/1968 | Schenk | 74/243 R |
| 3,477,303 | 11/1969 | Brilando | 74/243 |
| 3,995,487 | 12/1976 | Locke | 74/230 |
| 4,044,621 | 8/1977 | McGregor, Sr. et al. | 74/243 R |
| 4,078,445 | 3/1978 | Kiser, Jr. | 74/243 R |

FOREIGN PATENT DOCUMENTS

| | | | |
|---|---|---|---|
| 335746 | 10/1930 | United Kingdom | 74/243 R |
| 394706 | 7/1933 | United Kingdom | 74/243 R |

Primary Examiner—Leslie Braun
Attorney, Agent, or Firm—Clarence A. O'Brien; Harvey B. Jacobson

[57] ABSTRACT

A chain sprocket having guide plates comprising flanges of a frangible material located along opposite sides of the sprocket is disclosed teeth and projecting outwardly therefrom to prevent lateral disengagement of the chain under conditions of severe usage, particularly with use of the sprocket and chain assembly on a racing motorcycle. The guide plates are particularly useful in guiding the slack lower reach on of a motorcycle chain during acceleration of a motorcycle, and are also useful in guiding the slack upper reach of the chain during deceleration.

10 Claims, 3 Drawing Figures

CHAIN SPROCKET WITH OPPOSITE FRANGIBLE SIDE GUIDE PLATES

BACKGROUND OF THE INVENTION

1. Field of the Invention

The invention relates to a sprocket wheel and chain for imparting rotary motion to the sprocket and to a construction of sprocket wheel prevents disengagement of the chain. More particularly, the invention relates to a motorcycle sprocket and chain for use during conditions of severe stress, such as during motorcycle racing.

2. Description of the Prior Art

U.S. Pat. No. 1,181,175, issued May 2, 1916, to Shapiro, shows a sprocket wheel flange extending a short distance above the radial extent of a chain associated with the sprocket. Little guiding action can be expected from the flanges of Shapiro in view of the wide separation shown between the flanges and the chain itself, and impact on the flange could reasonably be expected to cause the flange to deform and interfere with normal movement of the chain. U.S. Pat. No. 4,044,621, issued Aug. 30, 1977, to McGregor, Sr., et al, shows a sprocket structure and chain guard having a single plate lining only one edge of one of a plurality of driving sprockets. No application is disclosed for a driven sprocket, nor do McGregor, Sr., et al, suggest a structure constructed to prevent throwing of the chain from a driven sprocket. Other patents relating generally to sprocket and chain assemblies include the following:

U.S. Pat. Nos: 579,742 - Mar. 10, 1897 - Cottie, et al.
3,477,303 - Nov. 11, 1969 - Brilando.

A disadvantage of existing racing motorcycle sprocket and chain assemblies is the frequent occurrence of throwing of chains or crawling of chains off the rear motorcycle sprocket during conditions of motorcycle racing over rough terrain at maximum speeds. Moreover, lateral motion of the driving chain has been known to interfere with other motorcycle components located in proximity thereto, such as the piston portions of shock absorbers along the upper chassis, particularly during deceleration of the motorcycle, in which phase of operation the upper portion of the chain undergoes slackening.

SUMMARY OF THE INVENTION

An object of the invention is to provide a chain sprocket with opposite side guide flanges to guide the slack portion of a sprocket chain into contact with sprocket teeth on the driven sprocket of the device, such guiding serving to prevent throwing off or crawling off of the chain during heavy use.

Another object of the invention is to provide a chain sprocket with opposite guide flanges constructed of a frangible material to prevent bending of the flange over the path of the chain.

Still another object of the invention is to provide a chain sprocket with opposite guide flanges having minimum total clearance in order to enhance the guiding action of the guide flanges.

A further object of the invention is to provide guide flanges which include opposite guide surfaces at least substantially parallel for a height above the seated chain position extending outwardly at least the height of the chain.

Yet a further object of the invention is to provide opposite side guide flanges which minimize transverse chain excursions and thereby protect the piston portions of shock absorbers along the upper chassis or frame, particularly during deceleration of the motorcycle.

Still a further object is to promote safe operation of racing motorcycles in minimizing the risk of injury to the rider by a disengaged chain, and to prevent damage to the motorcycle by a disengaged chain.

Yet another object is to increase the servicability of motorcycles under racing conditions to increase the likelihood of completing a race without interruption or with a minimum of lost time.

These objects, together with further objects to be described hereinafter, are achieved with use of a chain sprocket having conventional teeth for engaging a conventional chain made up of parallel link segments transversely joined by rivets, each rivet passing through a roller which exerts the driving force against the teeth. The sprocket of the present invention is characterized by side guide plates or flanges bolted thereto, and constructed of a frangible material which, due to its non-bendable character, is prevented from obstructing the path of the chain under impact, such as can result during heavy usage of the motorcycle, as during motorcycle racing. The flanges include at least substantially parallel opposite guide flange inner surfaces, extending outwardly above the level of the chain a distance at least equal to the radial extent or height of the chain.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
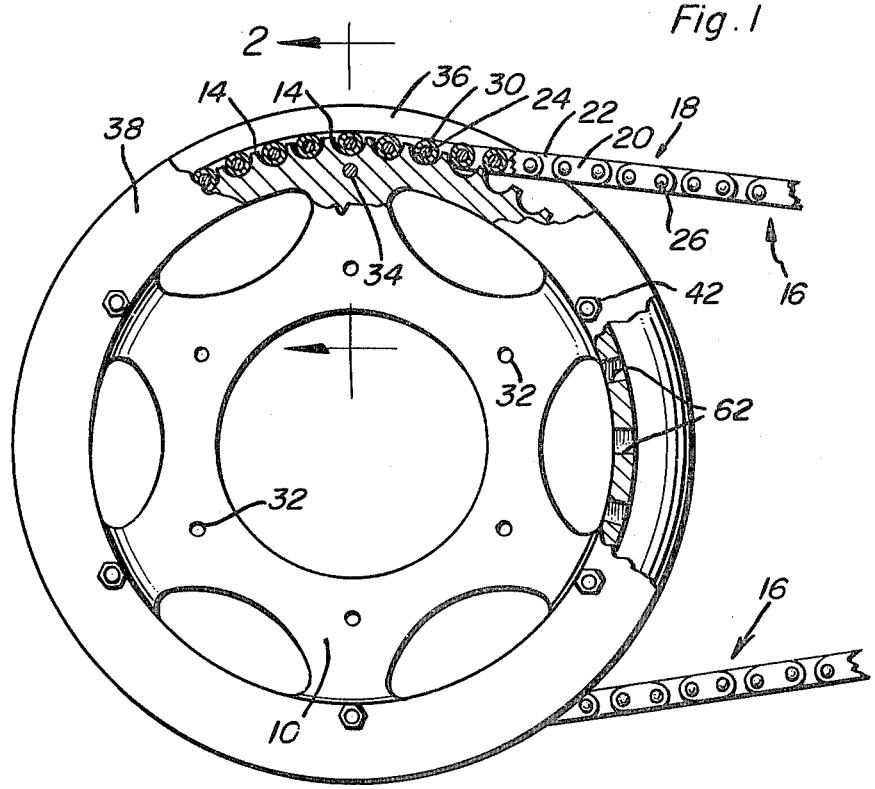
FIG. 1 is a side elevational view, broken away partly in section, of a motorcycle sprocket and associated chain protected by the side guide flanges of the present invention.
Figure 2:
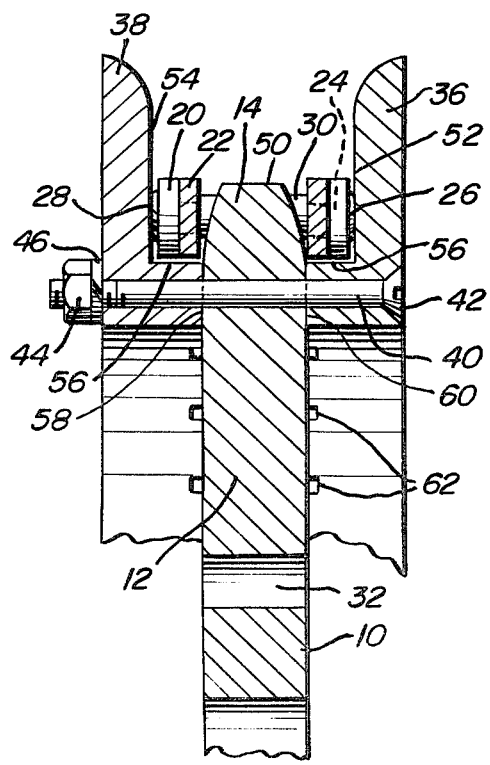
FIG. 2 is a radial sectional view, on an enlarged scale, taken substantially upon a plane passing along section line 2--2 on FIG. 1, showing the guide plates of the present invention bolted in place on the sprocket with a link of the chain in engagement with a tooth of the sprocket.

In FIG. 1, a conventional sprocket wheel is shown, composed of sprocket wheel 10, sprocket wheel rim 12, and sprocket wheel teeth 14. Chain 16, which is a conventional roller chain, is made up of individual links 18, alternately comprising an outer link 20 and an inner link 22, joined together by a rivet 24 having head 26 and opposite head 28. In the space between inner links 22, rivet 24 is surrounded by roller 30, which contacts teeth 14 for imparting rotary motion to sprocket wheel 10 or receiving force therefrom. Holes 32 in sprocket wheel 10 are provided to permit attachment of sprocket wheel 10 to a wheel hub (not shown). Sprocket wheel rim 12 is also provided with holes 34 for bolting of flanges 36 and 38 thereto with use of bolts 40, shown having countersunk heads 42, associated nut 44 and washer 46.

Figure 3:
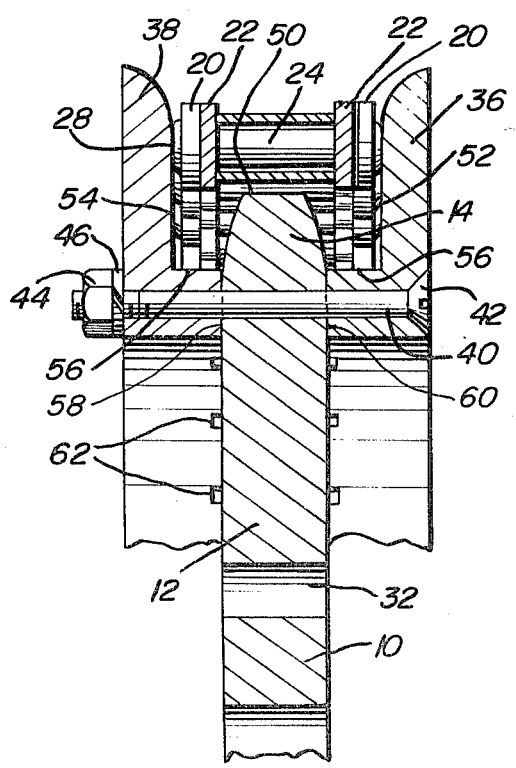
FIG. 3 is a representation of the chain under conditions of severe usage in which the chain is undergoing a tendency to be thrown radially outwardly, illustrating retention of the chain on the sprocket by the substantially parallel sides of the side guide flanges.

Flanges 36 and 38 are provided in accordance with the present invention to retain links 18 of chain 16 in alignment with teeth 14 of sprocket wheel 10, even under conditions wherein a portion of chain 16 might otherwise be thrown outwardly within and transversely from the plane of chain 16 under conditions of severe usage with forces acting on chain 16 in various directions, such as occurs during high speed motorcycle racing over rough terrain. FIG. 3 is a representation of a sprocket wheel tooth 14 in which the associated chain 16 is under upward urging radially outwardly. Even under the severe circumstances giving rise to the condition represented in the configuration of FIG. 3, however, flanges 36 and 38 prevent transverse forces from acting to allow chain 16 to slip from teeth 14. In order for such slipping to occur, it is necessary that the inner, lower, surface of link 22 ride on the outer flat surface 50 of tooth 14, permitting further rotation of sprocket wheel 10 to allow successive links to ride on adjacent teeth 14, with the ultimate result that chain 16 is disengaged from teeth 14 of wheel 10. By insuring that the height of flanges 36 and 38 above bed 56 is at least twice the height of link 22, while also insuring the lateral clearance between the inner side walls of flanges 36 and 38 and heads 26 and 28 of rivet 24 is minimized, the chain is confined in a manner which does not permit riding of the undersurface of links 22 on the outer surface 50 of teeth 14, even under the influence of severe stresses. Consequently, with the construction of the present invention, chain 16 is retained in alignment with rim 12 of sprocket wheel 10 and throwing or crawling off of chain 16 during such hard use is prevented.

Inasmuch as under conditions of severe usage during motorcycle races, the exposed outer surfaces of flanges 36 and 38 is likely to be subjected to impact when the motorcycle falls, collides with an object, or otherwise, the choice of material for flanges 36 and 38 is critical. Selection of flange material which is permanently deformable, malleable or yieldable would permit bending of flange 36 or 38 over the path of chain 16, thereby actually derailling the chain from the sprocket. Accordingly, flanges 36 and 38 must be selected from a material having a minimum elastic limit so that breaking, rather than permanent deforming, occurs under lateral impact or force. Breaking of a section of flange 36 or 38 would not necessarily impair the continued operation of the chain and sprocket assembly during the conclusion of a motorcycle race, and accordingly, the invention is particularly suitable for such a use.

It will be noted that during delivery of power, such as during acceleration of the motorcycle, the upper reach of chain 16 will be under tension, with some degree of slack characterizing the lower reach of the chain. The amount of slack will be enhanced somewhat during vibration or rocking of the rear motorcycle wheel, due to provisions conventionally made for pivoting of the rear wheel under the impact of such vibration or rocking, the pivoting occurring about a pivot point rearward of the point of convergence of the upper reach and lower reach of chain 16. Consequently, such pivotal motion reduces the separation between the centers of the forward driving sprocket and the rearward driven sprocket, thereby adding somewhat to the total amount of slack in the chain, which accumulates in the lower reach of chain 16 when the chain drives sprocket wheel 10. In consequence of the slack in the lower reach of chain 16, links of which are fed into the teeth 14 of sprocket wheel 10 at the lower portion thereof, it is at the lower portion of sprocket wheel 10 at which the greatest likelihood of disengagement exists, as is well recognized in the art. Consequently, it is the guiding action of flanges 36 and 38 in the lower portion of sprocket wheel 10 in FIG. 1 which prevents dislocation thereof, and from FIG. 1, it is apparent that the guiding action exists over the length of several links of chain 16, so long as the dimensional relationships to be described hereinafter are preserved. This guiding action, besides assisting in seating of chain 16 on sprocket wheel teeth 14, shortens the distance of unguided free play in the lower reach of chain 16, thereby reducing the lateral excursion permitted by the slack in chain 16. Conversely, when the rear motorcycle wheel drives the motor, such as when decelerating, or in coasting downhill, the upper reach of chain 16 will be slack, while the lower reach will be under tension. Since in conventional motorcycles, a minimum clearance exists between the upper reach of chain 16 abd the piston portion of shock absorbers typically attached to the chassis, it is common for laterally swaying chains in the upper reach during deceleration to score or otherwise affect the surface appearance of such pistons, thereby reducing the usefulness of the shock absorbers and necessitating costly replacement thereof. Since flanges 36 and 38 extend their guiding action outwardly, the degree of lateral excursion of the upper reach of chain 16 during deceleration is reduced, thereby preventing or minimizing such damage to shock absorbers.

Flanges 36 and 38 are preferably constructed with substantially parallel inner guide surfaces 52 and 54, inner surfaces 52 and 54 projecting outwardly from circumferential bed 56 at least double the radial extent or height of links 22 of chain 16. Flanges 36 and 38 preferably taper transversely outwardly from their inner guide surfaces 52 and 54 toward their outward radial extent with these surfaces diverging in smooth convex curves in order to assist in guiding links of chain 16 to the region bounded by bed 56 and surfaces 52 and 54. The total transverse clearance between the width of chain 16 and inner surfaces 52 and 54 ranges from 0 to about 0.050 inches, representing the sum of the clearance between flange 36 and head 26, and flange 38 and head 28. This small clearance also serves to clean the chain during use. For example, when racing on courses which have mud involved, the chain will be kept relatively free mud. The frangible material from which flanges 36 and 38 are constructed has a minimum elastic limit, and can be a material exemplified by cast iron or nylon, but a lightweight non-metallic material is preferred over a heavier metallic material due to the advantages resulting from lightweight racing motorcycles, and reduction in the moment of inertia of sprocket wheel 10, resulting in greater motorcycle acceleration for a given power output.

Further, the inner surfaces 58 and 60 of the flanges 36 and 38 inwardly of the beds 56 include generally radial relief grooves 62 formed therein for escape of any mud or dirt therethrough which may tend to collect between the flanges 36 and 38.

While the side guide plates or flanges of the present invention are particularly appropriate for incorporation in a sprocket wheel designed for motorcycle racing, other high speed industrial uses are also contemplated where power is delivered by a chain to a sprocket wheel rim.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A chain driven wheel sprocket for use in driving the rear wheel of a racing motorcycle wherein the sprocket is driven by a sprocket chain mechanically engageable therewith, and the sprocket is provided with opposite frangible side guide flanges having at least substantially parallel opposing flange guide surfaces for retaining therebetween the sprocket chain with a total lateral clearance between the guide surfaces and chain of from 0 to about 0.050 inches, said flange guide surfaces projecting outwardly beyond the chain at least the radial height of the chain and being constructed of a non-metallic frangible material having a minimum elastic limit such that breaking of the guide flange, rather than permanent deforming thereof, occurs under lateral impact or force, whereby continued operation of the chain and sprocket is not substantially impaired after occurrence of such lateral impact or force on the guide flange.

2. The device as claimed in claim 1 wherein said flanges comprise a pair of opposite annular rings having an inner periphery which includes a circumferential bed within which said chain resides, said bed of each of said flanges having a plurality of mounting holes coincident with mounting holes in said sprocket for mounting the flanges on the sprocket by a threaded bolt passing therethrough in association with a washer and a compatibly threaded nut tightened thereon.

3. The device as claimed in claim 2 wherein the radially outer peripheral portion of each of said guide surfaces of said flanges curve transversely outwardly to provide outwardly diverging smooth convex guide surfaces.

4. The device as claimed in claim 2 wherein the surfaces of rings opposing the adjacent sides of said sprocket include peripherally spaced grooves formed therein extending generally radially of the rings and including open opposite ends opening in opposite radial directions.

5. The device as claimed in claim 1 wherein said flanges extend outwardly a distance sufficient to reduce transverse displacement of the upper reach of said chain whereby the piston portion of a shock absorber mounted alongside the sprocket and chain and connected with the frame of the motorcycle is protected from contact with the chain.

6. The device as claimed in claim 1 wherein said frangible material is nylon.

7. In combination, a sprocket member having peripheral teeth thereon, a sprocket chain engaging a portion of the periphery of the sprocket member for transfer of driving force therebetween, and frangible guide means disposed peripherally of the sprocket member to retain the sprocket chain in radial alignment with the teeth on the sprocket member, the guide means being a lightweight frangible non-metal and including a pair of guide flanges projecting radially outwardly of the teeth with the inner guide surfaces of the guide flanges being spaced axially of the teeth a distance to closely receive the sprocket chain when moving into and out of engagement with the teeth, the inner guide surfaces of the guide flanges extending radially outwardly of the teeth a distance to engage and guide the chain when adjacent the radial outer end of the teeth, the inner guide surfaces having an axial separation which provides a total lateral axial clearance between the inner guide surfaces and the chain of less than about 0.050 inches, whereby transverse displacement of the chain is reduced to no more than about 0.050 inches, and whereby the chain is cleaned in use, the frangible non-metal guide means having a minimum elastic limit such that breaking of the guide flange, rather than permanent deforming thereof, occurs under lateral impact or force, whereby continued operation of the chain and sprocket member is not substantially impaired after occurrence of such lateral impact or force on the guide flange.

8. The combination as defined in claim 7 wherein said inner guide surfaces are peripherally continuous and rigid with the sprocket member for rotation therewith, the inner guide surfaces having parallel radially inner portions and diverging radially outward portions with diverging portions curving outwardly and defining radially convex surfaces, the distance between the parallel portions being not more than approximately 0.05 inches greater than the width of the chain to guide and clean the chain, the radial outer periphery of the parallel inner surfaces being disposed radially outwardly of the teeth a distance approximately equal to the height of the chain for guiding a substantial portion of the chain tangential to the sprocket member as the chain leaves or approaches the teeth, said flanges being constructed of frangible material to prevent inward bending thereof into the path of the chain.

9. The combination of claim 8 wherein said non-metal is nylon.

10. The combination of claim 9 wherein said guide flanges are mounted on said sprocket member by fastening means including a threaded bolt, a washer, and a compatibly threaded nut tightened thereon.

* * * * *